US009652060B2

United States Patent
Small

(10) Patent No.: US 9,652,060 B2
(45) Date of Patent: May 16, 2017

(54) LOW-LATENCY TOUCH FEEDBACK

(71) Applicant: Synaptics Incorporated, San Jose, CA (US)

(72) Inventor: Jeffrey Small, Rochester, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 454 days.

(21) Appl. No.: 13/930,966

(22) Filed: Jun. 28, 2013

(65) Prior Publication Data
US 2015/0002406 A1    Jan. 1, 2015

(51) Int. Cl.
*G06F 3/0488* (2013.01)
*G06F 3/041* (2006.01)

(52) U.S. Cl.
CPC ............ *G06F 3/041* (2013.01); *G06F 3/0416* (2013.01); *G06F 3/0488* (2013.01)

(58) Field of Classification Search
CPC ............ G09G 2320/0276; G06F 3/041; G06F 3/0488; G06F 3/0416
USPC ......................................... 345/173
See application file for complete search history.

(56) References Cited

U.S. PATENT DOCUMENTS

| 6,992,718 B1 * | 1/2006 | Takahara | G02B 23/14 348/333.09 |
| 2008/0303767 A1 * | 12/2008 | Ludden et al. | 345/89 |
| 2010/0134437 A1 * | 6/2010 | Yang et al. | 345/174 |
| 2010/0156656 A1 * | 6/2010 | Duarte et al. | 340/815.4 |
| 2010/0188328 A1 * | 7/2010 | Dodge et al. | 345/156 |
| 2010/0223484 A1 * | 9/2010 | Bold et al. | 713/324 |
| 2011/0080349 A1 | 4/2011 | Holbein et al. | |
| 2011/0080367 A1 | 4/2011 | Marchand et al. | |
| 2012/0102346 A1 * | 4/2012 | Haj-Yihia | 713/322 |
| 2012/0154303 A1 * | 6/2012 | Lazaridis et al. | 345/173 |
| 2012/0162129 A1 * | 6/2012 | Krah et al. | 345/174 |
| 2012/0182226 A1 * | 7/2012 | Tuli | G06F 3/0488 345/173 |
| 2012/0191993 A1 * | 7/2012 | Drader et al. | 713/320 |
| 2014/0092031 A1 * | 4/2014 | Schwartz et al. | 345/173 |
| 2014/0111451 A1 * | 4/2014 | Park | G06F 3/0488 345/173 |
| 2014/0118272 A1 * | 5/2014 | Gunn | G06F 3/0488 345/173 |
| 2014/0122911 A1 * | 5/2014 | Gunn | G06F 3/0488 713/323 |
| 2014/0366040 A1 * | 12/2014 | Parker et al. | 719/318 |
| 2015/0179150 A1 * | 6/2015 | Andrysco | G09G 5/391 345/156 |

\* cited by examiner

*Primary Examiner* — Lun-Yi Lao
*Assistant Examiner* — Kelly Hegarty
(74) *Attorney, Agent, or Firm* — Patterson + Sheridan, LLP

(57) ABSTRACT

Embodiments of the present invention generally provide a touch screen controller coupled to a touch sensor, a display, and a central processing unit. The touch screen controller is configured to detect first touch input received by the touch sensor and change a visual characteristic of the display upon detecting the first touch input. Detecting the first touch input and changing the visual characteristic are performed while the central processing unit is in a sleep state.

20 Claims, 5 Drawing Sheets

LOW-LATENCY TOUCH FEEDBACK

BACKGROUND OF THE INVENTION

Field of the Invention

Embodiments of the present invention generally relate to a system, device, and method for providing low-latency touch feedback with an input device.

Description of the Related Art

Display devices are widely used in a variety of electronic systems to provide visual information to a user. For example, display devices may be used to provide a visual interface to an electronic system, such as a desktop computer. Advancements in display technologies have enabled display devices to be incorporated into an increasing number of mobile applications, such as laptop computers, tablet computers, and mobile phones. In such applications, display devices may be implemented in conjunction with an input device, such as a touch sensor.

In conventional electronic systems, user input received by a touch sensor must be transmitted to a central processing unit (CPU) and processed by the CPU before the display can be updated to reflect the user input. As such, the CPU must be in an operating state in order to receive user input and provide display feedback. For example, for a user to unlock a mobile device, such as a mobile phone, the CPU first must be transitioned from a sleep state to an operating state. Once in an operating state, the CPU then processes input received by the touch sensor to determine whether the input matches an unlock gesture. If the input does not match an unlock gesture, the CPU may then return to the sleep state.

However, constantly transitioning the CPU from a sleep state to an operating state to determine whether input matches an unlock code or unlock gesture may decrease battery life. Additionally, requiring the CPU to receive and process all input received by an input device in order to provide display feedback is inefficient and may noticeably increase latency associated with user input.

Therefore, there is a need in the art for a more efficient way of providing feedback with a display device.

SUMMARY OF THE INVENTION

Embodiments of the present invention generally provide a touch screen controller coupled to a touch sensor, a display, and a central processing unit. The touch screen controller is configured to detect first touch input received by the touch sensor and change a visual characteristic of the display upon detecting the first touch input. Detecting the first touch input and changing the visual characteristic are performed while the central processing unit is in a sleep state.

Embodiments of the present invention may further provide a method for input sensing with a touch screen controller. The method includes detecting first touch input received by a touch sensor and changing a visual characteristic of a display upon detecting the first touch input. Detecting the first touch input and changing the visual characteristic are performed while a central processing unit is in a sleep state.

Embodiments of the present invention may further provide a touch screen controller for a touch screen device having a touch sensor and a display. The touch screen controller includes a sensor module and a display driver module. The sensor module is coupled to a central processing unit and the touch sensor and configured to detect first touch input received by the touch sensor. The display driver module is coupled to the display and configured to change a visual characteristic of the display when the sensor module detects the first touch input. Detecting the first touch input and changing the visual characteristic are performed while the central processing unit is in a sleep state.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a technique for generating low-latency feedback with an input device. An electronic controller (e.g., a touch screen controller) in the input device detects touch input received by a touch sensor. In response, the electronic controller may change a visual characteristic of a display associated with the input device independently of a central processing unit (CPU) associated with the input device. In one example, in response to detecting touch input, the electronic controller may change a visual characteristic of the display without waking the CPU from a sleep state. Advantageously, detecting and responding to touch input independently of the CPU may decrease latency associated with user input and/or reduce the frequency with which the CPU is woken from a sleep state in order to decrease energy consumption, which in battery operated devices, will advantageously extend battery life.

Figure 1:
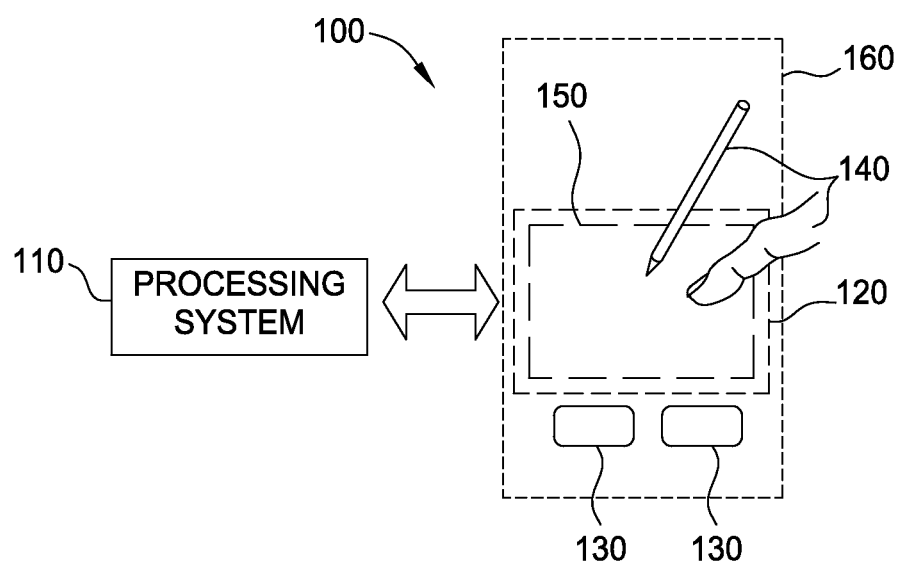
FIG. 1 is a block diagram of an exemplary display device in accordance with embodiments of the invention.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include the input device 100 and separate joysticks or key switches. Further example electronic systems include peripherals such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include I²C, SPI, PS/2, Universal Serial Bus (USB), Bluetooth, RF, and IRDA.

In the embodiment depicted in FIG. 1, the input device 100 is shown as a proximity sensor device (also often referred to as a "touch screen" or a "touch sensor") configured to sense input provided by one or more input objects 140 in a sensing region 120. Example input objects 140 include fingers and styli, as shown in FIG. 1.

In various embodiments, the sensing region 120 may overlay the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes comprise one or more common electrodes (e.g., "V-com electrode") used in updating the display of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrode. In addition, other display elements, such as source drivers, gate select lines, storage capacitors, and the like, may be used to perform capacitive sensing.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing unit of the electronic system that is separate from the processing system 110). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, the processing system 110 comprises a touch screen controller, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
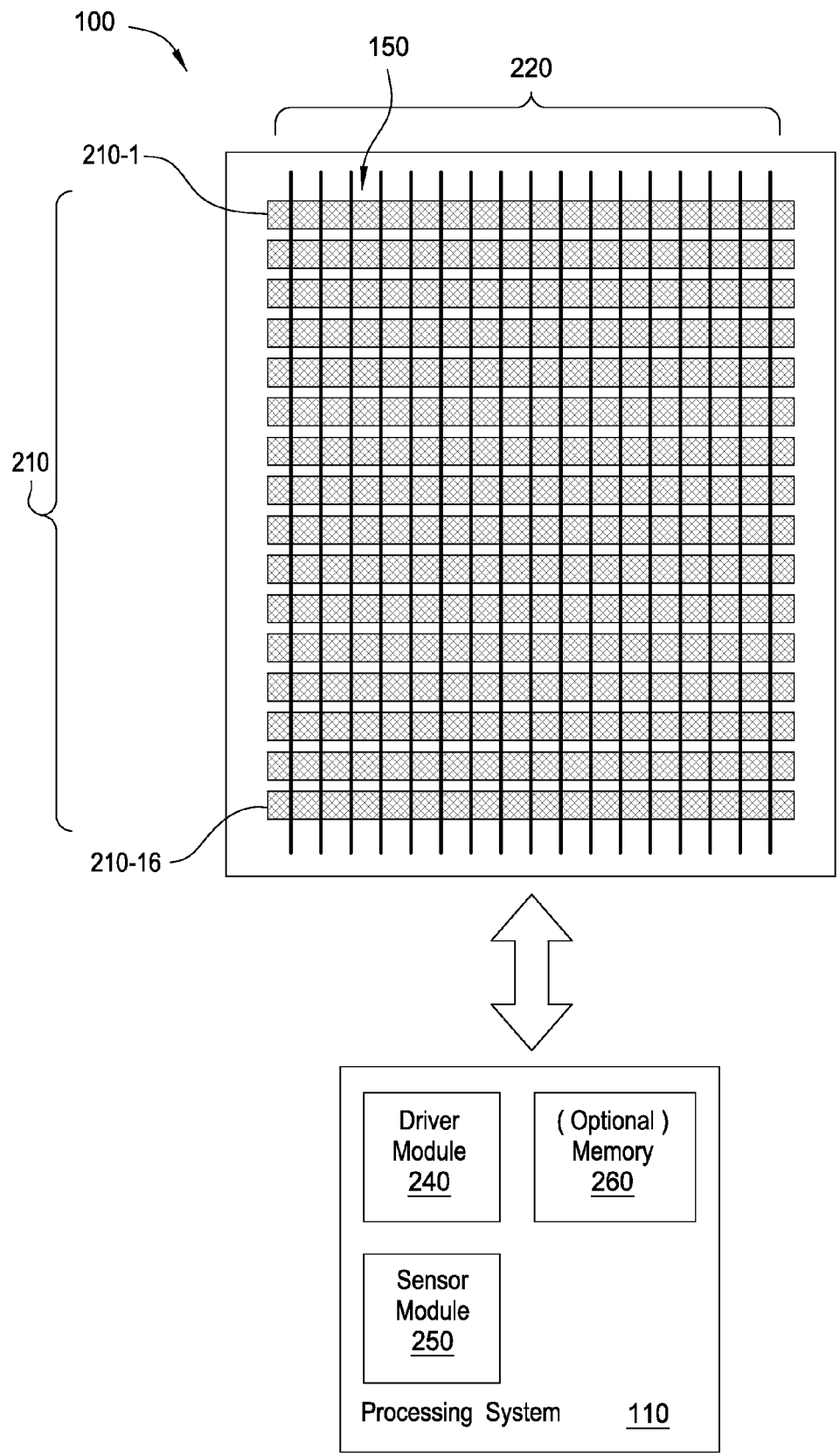
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150 and processing system 110. The array of sensing elements 150 includes a plurality of transmitter electrodes 210 (e.g., 210-1, 210-2, 210-3, etc.) and a plurality of receiver electrodes 220 (e.g., 220-1, 220-2, 220-3, etc.). Each transmitter electrode 210 may comprise one or more common electrodes. Additionally, in various embodiments, each receiver electrode 220 may comprise one or more common electrodes. In other embodiments, the array of sensing elements 150 includes a two-dimensional array of electrodes configured to sense self capacitance or absolute capacitance, as described above. The two-dimensional array of electrodes may be disposed on a single layer of the input device 100, for example, in order to reduce the thickness of the input device 100. The processing system 110 is coupled to the array of sensing elements 150, for example, through one or more routing traces.

Although a single processing system 110 is illustrated in FIG. 2, the input device 100 may include any appropriate number of processing system 110 ICs. As shown in FIG. 2, the processing system 110 may include a driver module 240, a sensor module 250, an optional memory 260, and/or a synchronization mechanism (not shown in FIG. 2).

The sensor module 250 is coupled to the plurality of receiver electrodes 220 and configured to receive resulting signals from the receiver electrodes 220 indicative of input (or lack of input) in the sensing region 120 and/or of environmental interference. The sensor module 250 may also be configured to determine the presence of an input object and/or pass the resulting signals to the optional memory 260 for storage.

The driver module 240, which includes driver circuitry, may be configured for updating images on the display of the display device 160. For example, the driver circuitry may be configured to apply one or more pixel voltages to the display pixel electrodes through pixel source drivers to change a visual characteristic of the display. The driver circuitry may also be configured to apply one or more common drive voltages to the common electrodes to update the display screen. In addition, the processing system 110 may be configured to operate the common electrodes as transmitter electrodes for input sensing by driving transmitter signals onto the common electrodes.

While the processing system illustrated in FIG. 2 includes one IC, the processing system may be implemented with more ICs to control the various components in the input device. For example, the functions of the processing system 110 may be implemented in more than one integrated circuit that can control the display module elements (e.g., common electrodes) and drive transmitter signals and/or receive resulting signals received from the array of sensing elements 150. In embodiments where there is more than one processing system 110 IC, communications between separate processing system 110 ICs may be achieved through a synchronization mechanism, which sequences the signals provided to the common electrodes. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below. In still other configurations, the transmitter electrodes 210 and the receiver electrodes 220 are optionally disposed on a single layer of the input device 100.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The receiver sensor electrodes may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In general, the processing system 110 transmits signals indicative of touch input to a central processing unit (CPU) that is separate from the processing system 110. The CPU may be part of a system on chip (SOC), which may include an integrated graphics processing unit (GPU), or the CPU may be a standalone IC. After receiving touch input from the processing system 110, the CPU transmits updated display data to the processing system 110. The processing system 110 receives the updated display data and applies one or more updated pixel voltages to the display pixel electrodes to update the display. Consequently, if touch input is detected by the processing system 110 when the CPU is in a low-power state, such as a sleep state, the processing system 110 typically must wake the CPU to enable the CPU to process the touch input and generate updated display data. However, under certain circumstances, the processing system 110 may be configured to receive and process user input independently of the CPU, as described below with respect to FIGS. 3-5B.

Low-Latency Touch Feedback

In various embodiments, the processing system 110 is configured to detect that touch input was received by the input device 100 and, in response, change a visual characteristic of the display device 160 without waking the CPU. For example, the processing system 110 may detect the presence of an input object 140 in the sensing region 120 and, in response, modify one or more pixel values in order to provide low-latency visual feedback to a user. In other embodiments, low-latency visual feedback may be provided to the user when the CPU is in an operating state and/or an intermediate power state. Exemplary techniques for providing low-latency visual feedback are described below.

Figure 3:
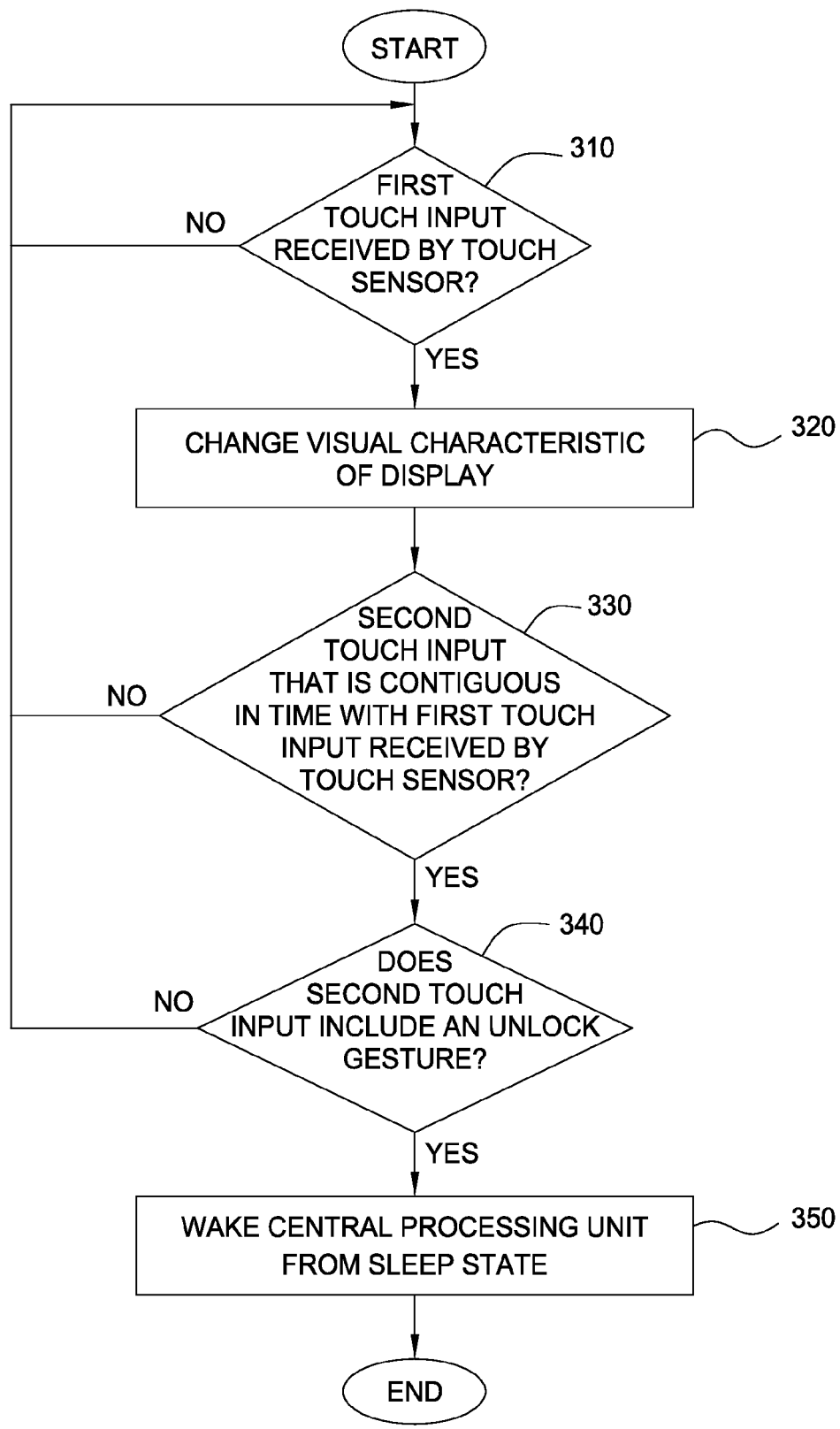
FIG. 3 is a flow diagram of a method for performing input sensing with the processing system of FIG. 1 in accordance with embodiments of the invention.

FIG. 3 is a flow diagram of a method 300 for performing input sensing with the processing system 110 of FIG. 1 in accordance with embodiments of the invention. Although the method 300 is described in conjunction with FIGS. 1 and 2, persons skilled in the art will understand that any system configured to perform the method, in any appropriate order, falls within the scope of the present invention.

The method 300 begins at step 310, where the processing system 110 determines whether first touch input has been received by the input device 100. When the processing system 110 determines that touch input received by the input device 100 includes or matches touch criteria associated with the first touch input, the processing system 110 provides feedback by modifying a visual characteristic of the display device 160 at step 320. If the first touch input is not received by the input device 100, then processing system 110 continues monitoring for touch input. In one embodiment, touch criteria associated with the first touch input may include any input received from an input object 140 by the input device 100. In other embodiments, touch criteria may correspond to one or more specified touch location(s), pressure(s), duration(s), surface area(s), and the like. Additionally, touch criteria may correspond to the proximity of an input object 140 to a surface of the input device 100.

In various embodiments, the processing system 110 may monitor for touch input while the CPU of the input device 100 is in a sleep state. For example, the CPU may be configured to enter a sleep state when the input device 100 is locked. While the CPU is in the sleep state, the processing system 110 monitors for first touch input and, upon detecting the first touch input, modifies a visual characteristic of the display device 160, such as displaying a stored image. In some embodiments, the visual characteristic of the display device 160 may be modified without waking the CPU from the sleep state. For example, the first touch input may be received from a user that is attempting to unlock the input device 100 and/or wake the CPU from the sleep state. In response to receiving the first touch input, the processing system may display a lock screen to enable the user to unlock the input device 100 and/or wake the CPU from the sleep state.

Next, at step 330, after determining that first touch input was received by the input device 100, the processing system may optionally determine whether a second touch input that is contiguous in time with the first touch input has been received by the input device 100. Second touch input may be considered to be contiguous in time with the first touch input if the second input is received by the input device 100 prior to the expiration of a threshold duration of time after step 310. The threshold duration of time may be any predefined duration of time. In one embodiment, the threshold duration of time is selected to enable a user to both view the visual characteristic changed by the processing system 110 in response to the first touch input (e.g., the display of a lock screen) and also input second touch input, such as an unlock gesture. For example, a threshold duration of time of about 5 to about 10 seconds may provide the user with enough time to both view the visual characteristic and input the second touch input.

At step 340, if touch input received by the input device 100 includes or matches touch criteria associated with the second touch input, then the processing system 110 may further determine whether the touch input includes an unlock gesture, such as an unlock pattern and/or unlock code. If the touch input includes an unlock gesture, then the processing system 110 may wake the CPU from the sleep state and/or cause the input device 100 to be unlocked. If second touch input is not received by the input device 100 within the threshold duration of time, then the processing system 110 may return to monitoring the input device 100 to detect first touch input at step 310.

When the processing system 110 is monitoring for the first touch input and/or second touch input, the processing system 110 may be in a normal operating state, or the processing system 110 may be in a low-power state. For example, the processing system 110 may be configured to enter a low-power state in which the processing system 110 is configured to detect only whether touch input has been received by the input device 100 but not the specific location at which the touch input was received.

Changing a visual characteristic of the display device 160 may include any perceivable change to an image displayed by the display device 160. Examples of changing a visual characteristic include displaying a different image on the display device 160, such as an image stored in the processing system 110 (e.g., in memory 260) or in an external memory accessible by the processing system 100 without communicating with the CPU. An image displayed on the display device may include a lock screen, a clock, user information, a user-defined image, and the like. Changing a visual characteristic of the display device 160 may further include changing one or more color values (e.g., red, green, and/or blue (RGB) color values) associated with an image, changing the brightness of an image, changing the backlight brightness, modifying the size or shape of an image, and/or changing any other parameter associated with a display device integrated circuit (DDI) included in, or separate from, the processing system 110. A change made to a visual characteristic of the display device 160 may affect the entire image displayed on the display device 160, or the change may be localized to one or more regions of the display device 160. For example, a change in a visual characteristic may be localized to the area(s) at which the touch input was received. In addition, the degree to which the visual characteristic is changed may depend on the duration for which touch input is received, the location at which touch input is received, and/or the pressure with which touch input is applied. For example, the degree to which a color value or brightness of the display device 160 is changed may depend on the duration and/or pressure associated with the touch input.

Figure 4:
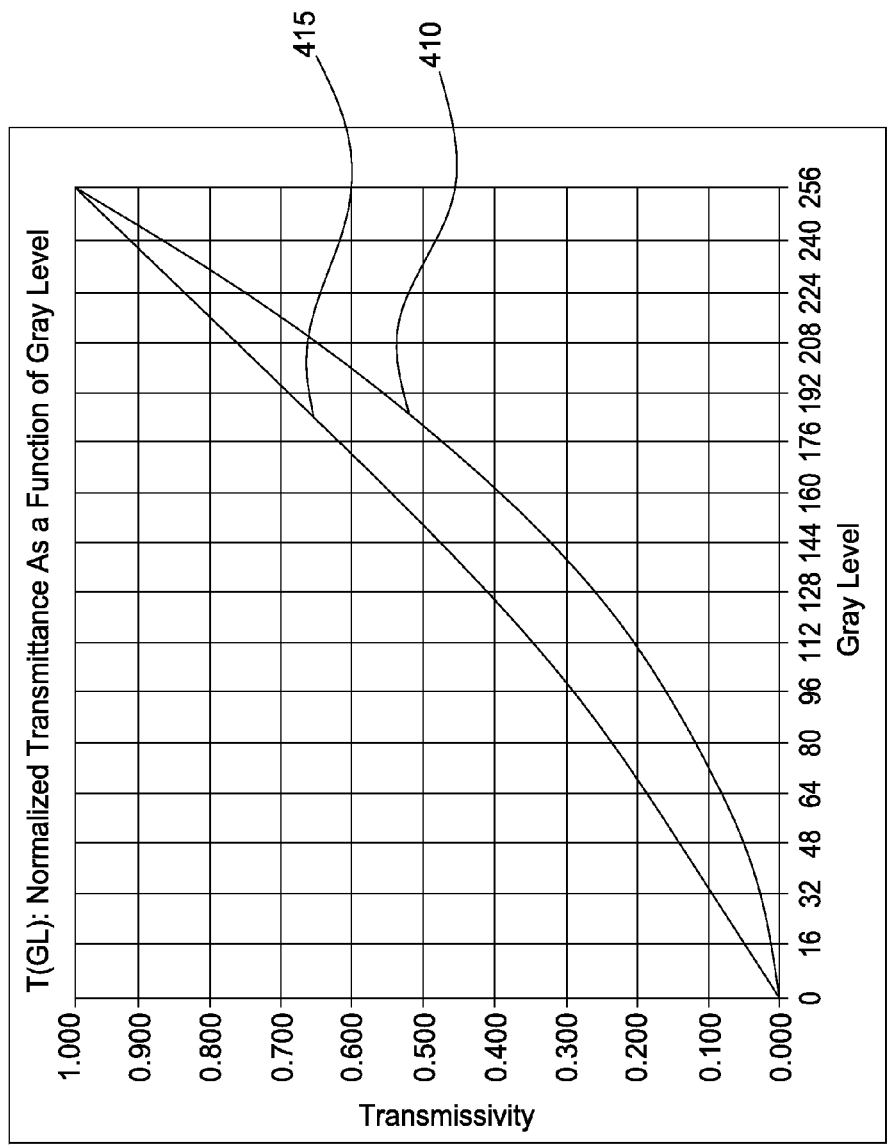
FIG. 4 illustrates normalized transmittance as a function of gray levels using a modified gamma curve in accordance with embodiments of the invention.

In one embodiment, in response to receiving the first touch input, the processing system 110 may change one or more gamma values associated with the display device 160, as shown in FIG. 4, which illustrates normalized transmittance as a function of gray levels using a modified gamma curve 415 in accordance with embodiments of the invention. For example, in response to receiving first touch input, the processing system 110 may remap gamma values from an initial gamma curve 410 to a boosted gamma curve 415 and/or a decreased gamma curve (not shown). Additionally, the degree to which the gamma curve is increased or decreased may be dependent on the duration, pressure, location, proximity, etc. of the touch input received by the input device 100. For example, one or more gamma values may be boosted or decreased as the proximity of an input object 140 to a surface of the input device 100 increases and/or decreases.

Figure 5A:
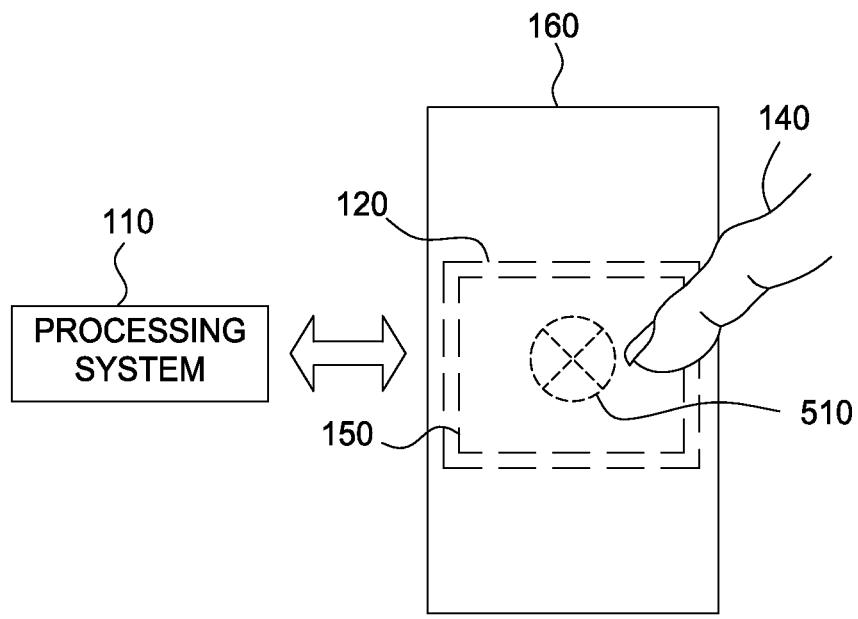
FIG. 5A illustrates the input device receiving touch input at a specified location in accordance with embodiments of the invention.

The first touch input and the second touch input received by the input device 100 may correspond to one or more specified touch location(s), pressure(s), duration(s), surface area(s), and the like. Additionally, the first touch input may correspond to the proximity of an input object 140 to a surface of the input device 100. In one embodiment, determining that the first touch input and/or second touch input was received by the input device 100 may include determining that touch input was received for a specified duration of time, at a specified location in the sensing region 120, and/or that the touch input was applied with a specified pressure or surface area. For example, the processing system 110 may determine that the input device 100 received touch input at a location 510, as shown in FIG. 5A, which illustrates the input device 100 receiving touch input at a specified location in accordance with embodiments of the invention. After determining that touch input was received at location 510, the processing system 110 may further determine whether the touch input was applied for a specified duration, with a specified pressure, and/or with a specified surface area.

Figure 5B:
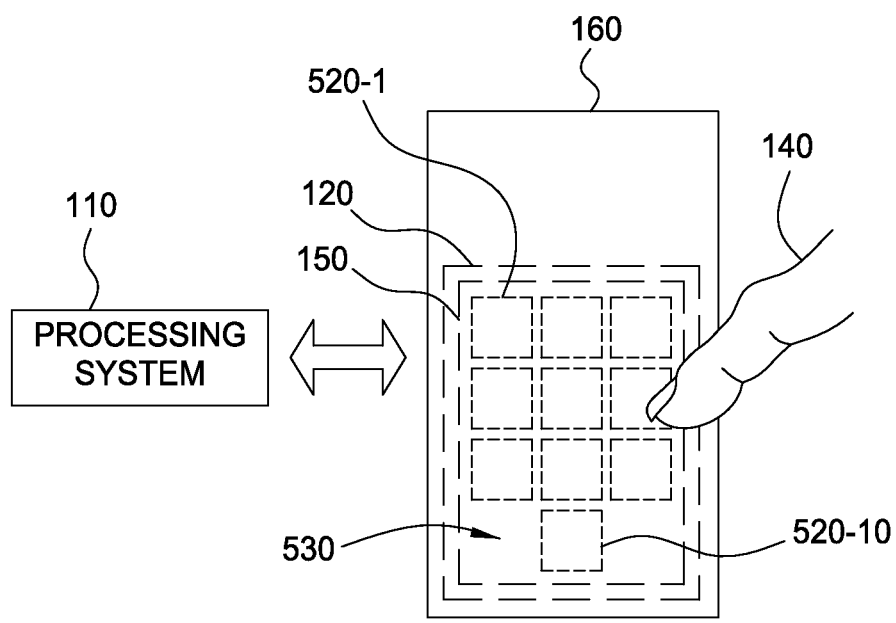
FIG. 5B illustrates the input device receiving touch input at one or more specified locations in accordance with embodiments of the invention.

In another embodiment, determining that the first touch input and/or second touch input was received by the input device 100 may include determining that touch input was received at a series of locations in the sensing region 120 in a specified order or in an unspecified order. For example, the processing system 110 may determine whether the touch input was received at a sequence of locations in the sensing region 120, as shown in FIG. 5B, which illustrates the input device 100 receiving touch input at one or more specified locations in accordance with embodiments of the invention. For example, the series of locations (e.g., locations 520-1 through 520-10) may correspond to characters, such as letters and/or numbers, displayed as a lock screen 530 on the display device 160, where the sequence in which touch input is received corresponds to a user password. Further, the lock screen 530 may correspond to an image stored in the processing system 110 or in a memory external to the processing system 110 that can be accessed and displayed without communicating with the CPU and/or waking the CPU from the sleep state.

In yet another embodiment, determining that the first touch input and/or second touch input was received by the input device 100 may include determining that touch input was received along a specified path with specified a starting point and/or ending point. For example, with reference to FIG. 5B, the processing system 110 may determine that touch input was received along a specified path starting at location 520-1 and ending at location 520-10. In another embodiment, receiving the first touch input and/or second touch input may include determining that an input object 140 is within a specified proximity of a surface of the input device 100. For example, the processing system 110 may determine that an input object 140 has been held within a specified proximity of a surface of the input device 100 for a specified duration of time.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. An arrangement, comprising:
   a touch screen controller comprising circuitry and communicatively coupled with a touch sensor, a display screen, and a central processing unit (CPU), wherein the touch screen controller is configured to:
   receive, while the CPU is in a sleep state and while applying a predefined first gamma curve having a first curvature to the display screen, a first touch input from the touch sensor; and
   change, based on the first touch input and while the CPU remains in the sleep state, a visual characteristic of the display screen to visually indicate that the first touch input satisfies one or more predetermined touch criteria, wherein changing the visual characteristic of the display screen comprises:
   determining, based on at least one touch characteristic of the first touch input, a second curvature different than the first curvature; and
   applying a second gamma curve having the second curvature to the display screen.

2. The arrangement of claim 1, wherein the touch screen controller is included in a display device integrated circuit (DDI), and wherein changing the visual characteristic of the display screen comprises changing a parameter associated with the DDI.

3. The arrangement of claim 1, wherein changing the visual characteristic of the display screen further comprises displaying a first predetermined image on the display screen.

4. The arrangement of claim 3, wherein the first predetermined image comprises a lock screen image.

5. The arrangement of claim 1, wherein the touch screen controller is further configured to:
- receive, while the CPU remains in the sleep state, a second touch input from the touch sensor; and
- wake, upon determining the second touch input corresponds to a predetermined unlock gesture and is contiguous in time with the first touch input, the CPU from the sleep state.

6. The arrangement of claim 1, wherein changing the visual characteristic of the display screen is based on a duration of the first touch input.

7. The arrangement of claim 1, wherein changing the visual characteristic of the display screen is based on an input pressure associated with the first touch input.

8. The arrangement of claim 1, wherein changing the visual characteristic of the display screen is based on a position of the first touch input.

9. The arrangement of claim 1, wherein the first touch input is provided by an input object, wherein the at least one touch characteristic of the first touch input comprises a proximity of the input object to a surface associated with the touch sensor.

10. The arrangement of claim 9, wherein determining a second curvature comprises:
- increasing from the first curvature when the proximity of the input object increases, wherein the second gamma curve comprises a boosted gamma curve.

11. The arrangement of claim 10, wherein the touch screen controller is further configured to:
- determine a third curvature different than the second curvature when the proximity of the input object decreases, wherein determining the third curvature comprises decreasing from the second curvature; and
- apply a third gamma curve having the third curvature to the display screen.

12. A method of input sensing using a touch screen controller coupled with a touch sensor, a display screen, and a central processing unit (CPU), the method comprising:
- receiving, while the CPU is in a sleep state and while applying a predefined first gamma curve having a first curvature to the display screen, a first touch input from the touch sensor; and
- changing, based on the first touch input and while the CPU remains in the sleep state, a visual characteristic of the display screen to visually indicate that the first touch input satisfies one or more predetermined touch criteria, wherein changing the visual characteristic of the display screen comprises:
  - determining, based on at least one touch characteristic of the first touch input, a second curvature different than the first curvature; and
  - applying a second gamma curve having the second curvature to the display screen.

13. The method of claim 12, wherein the touch screen controller is included in a display device integrated circuit (DDI), and wherein changing the visual characteristic of the display screen comprises changing a parameter associated with the DDI.

14. The method of claim 12, wherein changing the visual characteristic of the display screen further comprises displaying a first predetermined image on the display screen.

15. The method of claim 14, wherein the first predetermined image comprises a lock screen image.

16. The method of claim 12, further comprising:
- receiving, while the CPU remains in the sleep state, a second touch input from the touch sensor; and
- waking, upon determining the second touch input corresponds to a predetermined unlock gesture and is contiguous in time with the first touch input, the CPU from the sleep state.

17. The method of claim 12, wherein changing the visual characteristic of the display screen is based on a duration of the first touch input.

18. The method of claim 12, wherein changing the visual characteristic of the display screen is based on an input pressure associated with the first touch input.

19. A touch screen controller for a touch screen device having a touch sensor and a display screen, the touch screen controller comprising:
- a sensor module comprising circuitry and coupled with a central processing unit (CPU) and with the touch sensor, the sensor module configured to:
  - receive, while the CPU is in a sleep state, a first touch input from the touch sensor; and
  - determine at least one touch characteristic of the first touch input; and
- a display driver module coupled with the sensor module and with the display screen, the display driver module configured to:
  - apply a predefined first gamma curve having a first curvature to the display screen, wherein the first touch input is received while applying the first predefined gamma curve;
  - change, based on the first touch input and while the CPU remains in the sleep state, a visual characteristic of the display screen to visually indicate that the first touch input satisfies one or more predetermined touch criteria, wherein changing the visual characteristic of the display screen comprises:
    - determining, based on the at least one touch characteristic of the first touch input, a second curvature different than the first curvature; and
    - applying a second gamma curve having the second curvature to the display screen.

20. The touch screen controller of claim 19, wherein changing the visual characteristic of the display screen further comprises displaying a first predetermined image on the display screen.

* * * * *